US007985464B2

(12) United States Patent
Wu

(10) Patent No.: US 7,985,464 B2
(45) Date of Patent: Jul. 26, 2011

(54) CORE SHELL INTERMEDIATE TRANSFER COMPONENTS

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 377 days.

(21) Appl. No.: 12/181,354

(22) Filed: Jul. 29, 2008

(65) Prior Publication Data

US 2010/0028700 A1 Feb. 4, 2010

(51) Int. Cl.

| | |
|---|---|
| ***B32B 3/00*** | (2006.01) |
| ***B32B 5/16*** | (2006.01) |
| ***B32B 7/00*** | (2006.01) |

(52) U.S. Cl. ........ 428/206; 428/323; 428/331; 428/412; 428/473.5; 428/480; 428/500; 428/688

(58) Field of Classification Search .................. 428/206, 428/323, 331, 412, 473.5, 480, 500, 688
See application file for complete search history.

(56) References Cited

U.S. PATENT DOCUMENTS

| | | | | |
|---|---|---|---|---|
| 5,876,636 | A * | 3/1999 | Schlueter et al. .......... | 252/520.1 |
| 6,397,034 | B1 | 5/2002 | Tarnawskyj et al. | |
| 6,602,156 | B2 | 8/2003 | Schlueter, Jr. | |
| 7,031,647 | B2 | 4/2006 | Mishra et al. | |
| 7,130,569 | B2 | 10/2006 | Goodman et al. | |
| 7,139,519 | B2 | 11/2006 | Darcy, III et al. | |
| 7,280,791 | B2 | 10/2007 | Goodman et al. | |
| 7,738,824 | B2 | 6/2010 | Wu | |
| 2006/0002747 | A1 * | 1/2006 | Goodman et al. ............ | 399/302 |

* cited by examiner

*Primary Examiner* — Betelhem Shewareged
(74) *Attorney, Agent, or Firm* — Oliff & Berridge, PLC

(57) ABSTRACT

An intermediate transfer belt that includes a conductive core shell component thereover, wherein the core is, for example, comprised of a silica, and the shell is comprised of, for example, an antimony tin oxide.

26 Claims, No Drawings

CORE SHELL INTERMEDIATE TRANSFER COMPONENTS

CROSS REFERENCE TO RELATED APPLICATIONS

Illustrated in U.S. application Ser. No. 12/181,409, now U.S. Pat. No. 7,738,824, on Treated Carbon Black Intermediate Transfer Components, filed Jul. 29, 2008 with the listed individual of Jin Wu, the disclosure of which is totally incorporated herein by reference, is an intermediate transfer members comprised of a substrate comprising a poly(vinylalkoxysilane) surface treated carbon black.

BACKGROUND

Disclosed are intermediate transfer members, and more specifically, intermediate transfer members useful in transferring a developed image in an electrostatographic, for example xerographic, including digital, image on image, and the like, printers, machines or apparatuses. In embodiments, there are selected intermediate transfer members comprised of a conductive component with a core and a conductive shell, and more specifically, an inert core like silica, mica, and the like, and a conductive shell of a n-type semiconductor of, for example, antimony doped tin oxide or oxides. Yet more specifically, the intermediate transfer member, such as intermediate transfer belts (ITB), which is comprised of conductive particles of core shell structure, provides a number of advantages, including excellent dispersibility characteristics, and the capability to achieve a wide range of surface electrical resistivities. An example of the core shell material selected for the intermediate transfer member and intermediate transfer belt (ITB) is ZELEC® ECP 2610-S, which has a unique hollow silica core and conductive antimony doped tin oxide shell. The core shell particle usually possesses a low density due to its hollow core, and an elliptical shape to thereby provide excellent dispersibility in a polymeric solution.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant, which are commonly referred to as toner. Generally, the electrostatic latent image is developed by bringing a developer mixture into contact therewith. The developer mixture can comprise a dry developer mixture, which usually comprises carrier granules having toner particles adhering triboelectrically thereto, or a liquid developer material, which may include a liquid carrier having toner particles, dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently transfer with a high transfer efficiency the developed image from the intermediate transfer member to a permanent substrate.

The toner image is subsequently usually fixed or fused upon a support, which may be the photosensitive member itself, or other support sheet such as plain paper.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially 100 percent toner transfer occurs when most or all of the toner particles comprising the image are transferred, and little residual toner remains on the surface from which the image was transferred.

Intermediate transfer member advantages include enabling high throughput at modest process speeds, improving registration of the final color toner image in color systems using synchronous development of one or more component colors using one or more transfer stations, and increasing the range of final substrates that can be used. However, a disadvantage of using an intermediate transfer member is that a plurality of transfer steps is usually needed allowing for the possibility of charge exchange occurring between toner particles and the transfer member which ultimately can lead to less than complete toner transfer. This results in low resolution images on the image receiving substrate and also image deterioration. When the image is in color, the image can additionally suffer from color shifting and color deterioration with a number of transfer stops.

In embodiments, the resistivity of the intermediate transfer member is within a range to allow for sufficient transfer. It is also desired that the intermediate transfer member have a controlled resistivity, wherein the resistivity is virtually unaffected by changes in humidity, temperature, bias field, and operating time. In addition, a controlled resistivity is of value so that a bias field can be established for electrostatic transfer. Also, it is of value that the intermediate transfer member not be too conductive as air breakdown can possibly occur.

In U.S. Pat. No. 6,397,034, there is disclosed the use of a fluorinated carbon filler in a polyimide intermediate transfer member layer. However, there are disadvantages associated with these members such as undissolved particles frequently bloom or migrate to the surface of the polymer layer which leads to nonuniform resistivity characteristics, which in turn causes poor antistatic properties and poor mechanical strength. Also, the ionic additives present on the surface of the belt may interfere with toner release, and bubbles may appear in the conductive polymer layer, some of which can only be seen with the aid of a microscope, others of which are large enough to be observed with the naked eye, resulting in poor or nonuniform electrical properties and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 percent to 80 percent relative humidity. This effect limits the operational or process latitude of the intermediate transfer member.

Therefore, it is desired to provide a weldable intermediate transfer belt, which has excellent transfer ability. It is also desired to provide a weldable intermediate transfer belt that may not have puzzle cut seams, but instead has a weldable seam, thereby providing a belt that can be manufactured without such labor intensive steps as manually piecing together the puzzle cut seam with ones fingers, and without the lengthy high temperature and high humidity conditioning steps. It is also desired to provide an acceptable circumference weldable belt for color machines.

REFERENCES

Illustrated in U.S. Pat. No. 7,130,569, the disclosure of which is totally incorporated herein by reference, is a weldable intermediate transfer belt comprising a substrate comprising a homogeneous composition comprising a polyaniline in an amount of from about 2 to about 25 percent by weight of total solids, and a thermoplastic polyimide present in an amount of from about 75 to about 98 percent by weight of total solids, wherein the polyaniline has a particle size of from about 0.5 to about 5.0 microns.

Also referenced are U.S. Pat. No. 7,031,647, the disclosure of which is totally incorporated herein by reference, which illustrates an intermediate transfer belt, comprising a belt substrate comprising primarily at least one polyimide polymer; and a welded seam; and U.S. Pat. No. 7,139,519, the disclosure of which is totally incorporated herein by reference, which illustrates an image forming apparatus for forming images on a recording medium comprising:

a charge-retentive surface to receive an electrostatic latent image thereon;

a development component to apply toner to the charge-retentive surface to develop the electrostatic latent image to form a developed toner image on the charge retentive surface;

an intermediate transfer member to transfer the developed toner image from the charge retentive surface to a copy substrate, wherein the intermediate transfer member comprises a substrate comprising a first binder and lignin sulfonic acid doped polyaniline dispersion; and a fixing component to fuse the developed toner image to the copy substrate.

Also referenced is U.S. Pat. No. 7,280,791, the disclosure of which is totally incorporated herein by reference, which illustrates a weldable intermediate transfer belt comprising a substrate comprising a homogeneous composition comprising polyaniline in an amount of from about 2 to about 25 percent by weight of total solids, and thermoplastic polyimide in an amount of from about 75 to about 98 percent by weight of total solids, wherein the polyaniline has a particle size of from about 0.5 to about 5.0 microns.

Use of a polyaniline filler in a polyimide has been disclosed in U.S. Pat. No. 6,602,156. This patent discloses, for example, a polyaniline filled polyimide puzzle cut seamed belt. The manufacture of a puzzle cut seamed belt is labor intensive and very costly, and the puzzle cut seam, in embodiments, is sometimes weak. The manufacturing process for a puzzle cut seamed belt usually requires a lengthy high temperature and high humidity conditioning step.

SUMMARY

Included within the scope of the present disclosure is an intermediate transfer belt, and intermediate members other than belts comprised of a substrate comprising a conductive core shell component; an intermediate transfer media comprised of a substrate comprising a core and a shell thereover, and wherein the shell is comprised of an antimony tin oxide represented by $Sb_xSn_yO_z$, wherein x represents the number of atoms, and for example, where x is from about 0.02 to about 0.98, y is from about 0.51 to about 0.99, and z is from about 2.01 to about 2.49; and an apparatus for forming images on a recording medium comprising a charge retentive surface to receive an electrostatic latent image thereon;

a development component to apply toner to the charge retentive surface to develop the electrostatic latent image, and to form a developed image on the charge retentive surface; and an intermediate transfer belt to transfer the developed image from the charge retentive surface to a substrate, wherein the intermediate transfer belt comprises a conductive core shell component thereover, wherein the core is selected from the group consisting of mica, silica, and titania, and the shell is comprised of a metal oxide.

In addition, the present disclosure provides, in embodiments, an apparatus for forming images on a recording medium comprising a charge-retentive surface to receive an electrostatic latent image thereon; a development component to apply toner to the charge-retentive surface to develop the electrostatic latent image and to form a developed image on the charge retentive surface; a weldable intermediate transfer belt to transfer the developed image from the charge retentive surface to a substrate, wherein the intermediate transfer belt is as illustrated herein; and a fixing component.

EMBODIMENTS

In embodiments, the core shell is comprised of micron size particles of an inert core and a conductive shell in which the inert core can be silica, mica, titania, mixtures thereof, or the like. The conductive shell can be an n-type semiconductor, for example a metal oxide or a doped metal oxide. In embodiments, the metal oxide or doped metal oxide may be selected from the group consisting of titanium oxide, zinc oxide, tin oxide, aluminum doped zinc oxide, antimony doped titanium dioxide, antimony doped tin oxide, similar doped oxides, and mixtures thereof.

An example of a suitable shell is ZELEC® ECP available from Milliken Chemical. ZELEC® ECP is comprised of a dense layer of crystallites of antimony doped tin contained on a silica core. In embodiments, the antimony doped tin oxide is considered the conductive phase with the antimony being in a solid solution with the tin oxide. The low density and elliptical shape of the ECP-S provides excellent dispersibility in polymeric solutions. Examples of ZELEC® ECP-S include 1610-S (3 μm, oil absorption about 210 grams/100 grams), 2610-S (3 μm, oil absorption about 150 grams/100 grams), 1703-S (3 μm, oil absorption about 230 grams/100 grams), and 2703-S (3 μm, oil absorption about 170 grams/100 grams).

In embodiments, the core shell has a particle diameter of from about 1 to about 10, or from about 3 to about 5 microns. The thickness of the conductive shell is, for example, from about 0.001 to about 9, or from about 0.01 to about 0.5 micron.

The core shell conductive component of the present disclosure is usually formed into a dispersion with a number of materials, such as a polyamic acid solution, and a polyimide precursor. With moderate mechanical stirring, uniform dispersions can be obtained, and then coated on glass plates using draw bar coating methods. The resulting films can be dried by heating at temperatures such as from about 100° C. to about 400° C. for about 20 to about 180 minutes while remaining on the glass plate. After drying and cooling to room temperature, the film on the glass can be immersed into water overnight, about 18 to 23 hours, and subsequently, the about 50 to about 150 microns thick films can be released from the glass to form functional intermediate transfer members.

Examples of the suitable polyamic acid solutions (polyimide precursors) include low temperature and fast cured polyimide polymers, such as VTEC™ Pi 1388, 080-051, 851, 302, 203, 201 and PETI-5™, all available from Richard Blaine International, Incorporated, Reading, Pa. The thermosetting polyimides are cured at low temperatures, and more specifically, from about 180° C. to about 260° C. over a short period of time, such as from about 10 to about 120 minutes, and from about 20 to about 60 minutes; possess a number average molecular weight of, for example, from about 5,000 to about 500,000, or from about 10,000 to about 100,000, and a weight average molecular weight of, for example, from about 50,000 to about 5,000,000, or from about 100,000 to about 1,000,000. Thermosetting polyimide precursors that are cured at higher temperatures (above 300° C.) than the VTEC™ PI polyimide precursors, and that can be selected for the transfer member include PYRE-M.L® RC-5019. RC-5057, RC-5069, RC-5097, RC-5053 and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN and FN, all commercially available from E.I. DuPont, Wilmington, Del.

The core shell conductive component of the present disclosure can also be incorporated into thermoplastic materials such as polyimide, polycarbonate, polyvinylidene fluoride (PVDF), poly(butylene terephthalate) (PBT), poly(ethylene-co-tetrafluoroethylene) copolymer, and/or their blends. Particularly, the thermoplastic polyimide examples include KAPTON® KJ, commercially available from E.I. DuPont, Wilmington, Del., represented by

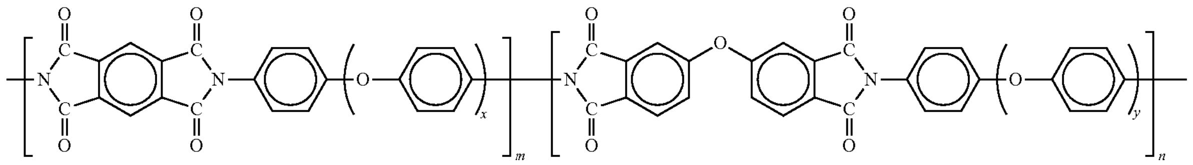

wherein x is 2, y is 2, m, and n are from about 10 to about 300; and IMIDEX®, commercially available from West Lake Plastic Company, represented by

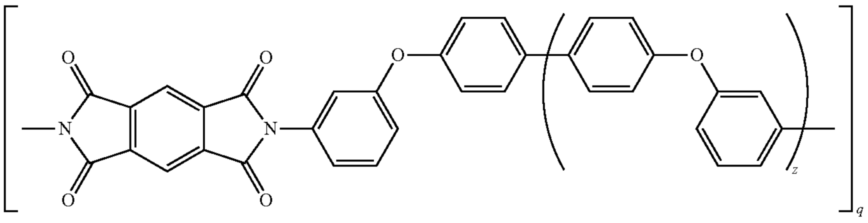

wherein z is 1, and q is from about 10 to about 300.

Also, in embodiments, examples of components that can be incorporated in the intermediate transfer members include conductive components and polymers, such as carbon fillers, polyanilines and mixtures thereof. Specific examples of carbon fillers are carbon black, graphite, and carbon nanotubes. Specific examples of polyanilines are PANIPOL® F commercially available from Panipol Oy, Finland; and lignosulfonic acid grafted polyaniline, represented by

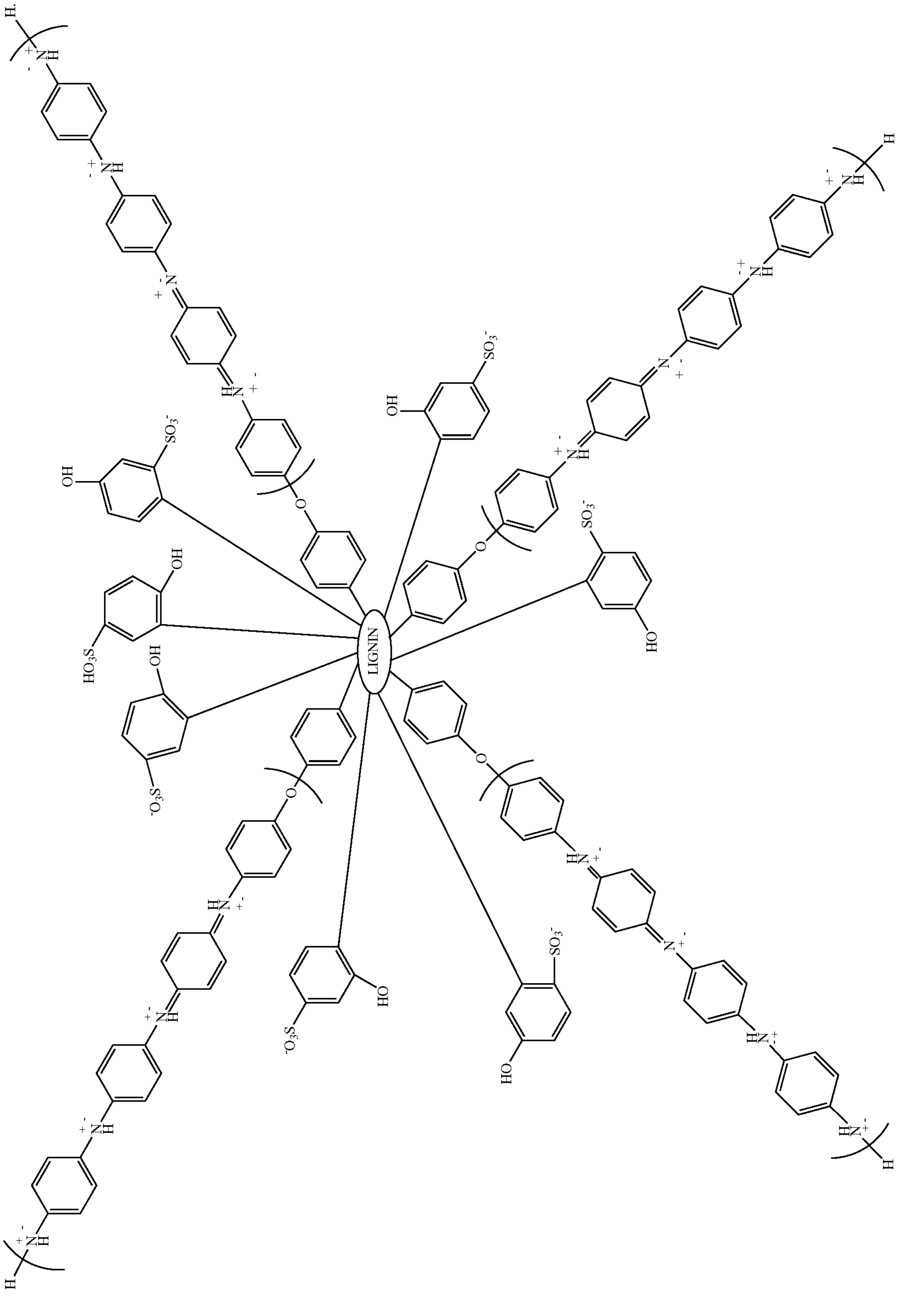
LIGNIN

In embodiments, the polyaniline component has a relatively small particle size of from about 0.5 to about 5, from about 1.1 to about 2.3, from about 1.2 to about 2, from about 1.5 to about 1.9, or about 1.7 microns.

The amount of conductive components in the intermediate transfer member are, for example, from about 1 to about 40, from about 3 to about 30, or from about 5 to about 20 weight percent, wherein the core shell conductive component amount is from about 1 to about 100, from about 10 to about 70, or from about 30 to about 50 percent of the total conductive components.

In embodiments, a doped metal oxide refers, for example, to mixed metal oxides with at least two metals. Thus, for example, the antimony doped tin oxide comprises less than or equal to about 50 percent of antimony oxide, and the remainder is tin oxide; and a tin doped antimony oxide comprises less than or equal to about 50 percent of tin oxide, and the remainder is antimony oxide.

Generally, in embodiments the antimony tin oxide can be represented by $Sb_xSn_yO_z$ wherein x is, for example, from about 0.02 to about 0.98, y is from about 0.51 to about 0.99, and z is from about 2.01 to about 2.49, and more specifically, wherein this oxide is comprised of from about 1 to about 49 percent of $Sb_2O_3$ and from about 51 to about 99 percent of $SnO_2$. In embodiments, x is from about 0.40 to about 0.90, y is from about 0.70 to about 0.95, and z is from about 2.10 to about 2.35; and more specifically, x is about 0.75, y is about 0.45, and z about 2.25; and wherein the shell is comprised of from about 1 to about 49 percent of antimony oxide, and from about 51 to about 99 percent of tin oxide, from about 15 to about 35 percent of antimony oxide, and from about 85 to about 65 percent of tin oxide, and wherein the total thereof is about 100 percent; or from about 40 percent of antimony oxide, and about 60 percent of tin oxide, and wherein the total thereof is about 100 percent.

The surface resistivity of the intermediate transfer members disclosed herein is, for example, from about $10^9$ to about $10^{13}$, or from about $10^{10}$ to about $10^{12}$ ohm/sq. The sheet resistivity of the intermediate transfer weldable members disclosure is, for example, from about $10^9$ to about $10^{13}$, or from about $10^{10}$ to about $10^{12}$ ohm/sq.

The intermediate transfer member can be of any suitable configuration. Examples of suitable configurations include a sheet, a film, a web, a foil, a strip, a coil, a cylinder, a drum, an endless strip, a circular disc, a belt including an endless belt, and an endless seamed flexible belt. The circumference of the belt configuration for 1 to 2 or more layers is, for example, from about 250 to about 2,500, from about 1,500 to about 2,500, or from about 2,000 to about 2,200 millimeters. The width of the film or belt is, for example, from about 100 to about 1,000, from about 200 to about 500, or from about 300 to about 400 millimeters.

Intermediate transfer member roughness can be characterized by microgloss wherein a rougher surface has a lower microgloss than a smoother surface. The microgloss values of the weldable transfer belt can be, for example, from about 85 to about 110, from about 90 to about 105, or from about 93 to about 98 gloss units, at an 850 angle. The present disclosed belt, in embodiments, achieved a desired high gloss level without the need for additional fillers. Microgloss is a measure of the amount of light reflected from the surface at a specific angle, and can be measured with commercial equipment such as the Micro-TR1-gloss instrument from BYK Gardner.

Specific embodiments will now be described in detail. These examples are intended to be illustrative, and the disclosure is not limited to the materials, conditions, or process parameters set forth in these embodiments. All parts are percentages by weight of total solids unless otherwise indicated.

Example I

Conductive particles of ZELEC® ECP 2610-S (silica core and antimony tin oxide shell), available from Milliken Chemical, 3 μm in diameter, oil absorption of about 150 grams/100 grams, were mixed with the polyamic acid solution (VTEC™ PI 1388, a polyimide liquid, 20 weight percent solids in N-methyl-2-pyrrolidone, NMP) at a ratio of 15/85. With moderate mechanical stirring for 2 hours (no milling media), uniform dispersions were obtained, and then coated on glass plates using a draw bar coating method. The films obtained were dried at 100° C. for 20 minutes, and then at 204° C. for 20 minutes while remaining on the glass plate. After drying and cooling to room temperature, about 25° C., the films on each of the glass plates were immersed into water overnight, about 23 hours, and there resulted 50 micron thick films that were released from the glass. The films, which were the intermediate transfer belt product, were comprised of 15 weight percent of the ZELEC® ECP conductive component (particles with two layers of silica hallow core and antimony tin oxide shell, with the shell being chemically attached to the core), and 85 weight percent of the VTEC™ PI 1388 polyimide.

Example II

Conductive particles of the above ZELEC® ECP 2610-S, available from Milliken Chemical, 3 μm in diameter, oil absorption of about 150 grams/100 grams, were mixed with the polyamic acid solution (VTEC™ PI 1388, a polyimide liquid, 20 weight percent solids in N-methyl-2-pyrrolidone, NMP) at a ratio of 20/80. With moderate mechanical stirring for 2 hours (no milling media), uniform dispersions were obtained, and then coated on glass plates using a draw bar coating method. The films obtained were dried at 100° C. for 20 minutes, and then at 204° C. for 20 minutes while remaining on the glass plate. After drying and cooling to room temperature, about 25° C., the films were immersed into water overnight, about 23 hours, and there resulted 50 micron intermediate transfer belts or films that were released from the glass. The films were comprised of 20 weight percent of the Example I ZELEC® ECP conductive component, and 80 weight percent of the Example I VTEC™ PI 1388 polyimide.

Surface Resistivity Measurement

The free standing films of Examples I and II were measured for surface resistivity (under 1,000V, averaging four measurements at varying places or locations, 72° F., 22 percent room humidity) using a High Resistivity Meter (Hiresta-Up MCP-HT450 from Mitsubishi Chemical Corp.), and the results are shown in Table 1.

TABLE 1

| | Surface Resistivity (ohm/sq) |
|---|---|
| Example I | $4.97 \times 10^{13}$ |
| Example II | $5.65 \times 10^{8}$ |

With a PI/ZELEC®=85/15 ITB formulation (Example I), the surface resistivity was measured as $4.97 \times 10^{13}$ Ω/sq (uniform resistivity across the film); and with a PI/ZELEC®=80/20 ITB formulation (Example II), the surface resistivity was measured as $5.65\times10^8$ Ω/sq (uniform resistivity across the film). Functional ITB members were obtained with the above disclosed core shell conductive components.

One advantage of the core shell intermediate media, and more specifically, the intermediate transfer belts illustrated herein as demonstrated by the Table 1 information, is the simplicity of formulating the media mixture and the use of a hallow core.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer belt comprised of a substrate comprising a conductive core shell component, and wherein said core is selected from the group consisting of silica, mica, titania, and mixtures thereof, and said shell is a metal oxide, and said core shell component is dispersed in a polymer selected from the group consisting of a polycarbonate, a poly(butylene terephthalate), and mixtures thereof.

2. An intermediate transfer belt in accordance with claim 1 wherein said core is silica.

3. An intermediate transfer belt in accordance with claim 2 wherein said silica core is hollow.

4. An intermediate transfer belt in accordance with claim 1 wherein said metal oxide is selected from the group consisting of titanium oxide, zinc oxide, tin oxide, and mixtures thereof.

5. An intermediate transfer belt in accordance with claim 1 wherein said metal oxide is a doped metal oxide selected from the group consisting of aluminum doped zinc oxide, antimony doped titanium dioxide, antimony doped tin oxide, and mixtures thereof.

6. An intermediate transfer belt in accordance with claim 5 wherein said doped metal oxide is antimony doped tin oxide.

7. An intermediate transfer belt in accordance with claim 1 wherein said conductive core shell component has a particle diameter of from about 1 to about 10 microns, and said shell of said conductive core shell component has a thickness of from about 0.001 to about 9 microns.

8. An intermediate transfer belt in accordance with claim 1 wherein said conductive core shell component has a particle diameter of from about 3 to about 5 microns, and said shell of said conductive core shell component has a thickness of from about 0.01 to about 0.5 micron.

9. An intermediate transfer belt in accordance with claim 1 wherein said conductive core shell component is present in an amount of from about 1 to about 30 percent by weight based on the weight of total solids.

10. An intermediate transfer belt in accordance with claim 9 wherein said conductive core shell component is present in an amount of from about 5 to about 20 percent by weight based on the weight of total solids.

11. An intermediate transfer belt in accordance with claim 1 wherein said belt is weldable.

12. An intermediate transfer belt in accordance with claim 1 further including in the core shell component a conductive component of at least one of a polyaniline, a carbon black filler, and mixtures thereof present in an amount of from about 1 to about 30 percent by weight based on the weight of total solids.

13. An intermediate transfer belt in accordance with claim 12 wherein said conductive component is present in an amount of from about 3 to about 15 percent by weight based on the weight of total solids.

14. An intermediate transfer belt in accordance with claim 1 wherein said belt has a surface resistivity of from about $10^9$ to about $10^{13}$ ohm/sq.

15. An intermediate transfer belt in accordance with claim 14 wherein said surface resistivity is from about $10^{10}$ to about $10^{12}$ ohm/sq.

16. An intermediate transfer belt in accordance with claim 1 further comprising an outer release layer positioned on said substrate.

17. An intermediate transfer belt in accordance with claim 16 wherein said release layer comprises poly(vinyl chloride).

18. An intermediate transfer belt in accordance with claim 1 wherein said intermediate transfer belt has a circumference of from about 250 to about 2,500 millimeters.

19. An intermediate transfer belt in accordance with claim 1 wherein said metal oxide shell is comprised of an antimony tin oxide represented by $Sb_xSn_yO_z$ wherein x is from about 0.02 to about 0.98, y is from about 0.51 to about 0.99, and z is from about 2.01 to about 2.49.

20. An intermediate transfer belt in accordance with claim 1 wherein said metal oxide shell is comprised of an antimony tin oxide represented by $Sb_xSn_yO_z$, wherein x is from about 0.40 to about 0.90, y is from about 0.70 to about 0.95, and z is from about 2.10 to about 2.35.

21. An intermediate transfer belt in accordance with claim 1 wherein said metal oxide shell is comprised of an antimony tin oxide represented by $Sb_xSn_yO_z$, wherein x is about 0.75, y is about 0.45, and z is about 2.25.

22. An intermediate transfer belt in accordance with claim 1 wherein said metal oxide shell is comprised of from about 1 to about 49 percent of antimony oxide, and from about 51 to about 99 percent of tin oxide.

23. An intermediate transfer belt in accordance with claim 1 wherein said metal oxide shell is comprised of from about 15 to about 35 percent of antimony oxide, and from about 85 to about 65 percent of tin oxide, and wherein the total thereof is about 100 percent.

24. An intermediate transfer belt in accordance with claim 1 wherein said metal oxide shell is comprised of from about 40 percent of antimony oxide, and about 60 percent of tin oxide, and wherein the total thereof is about 100 percent.

25. An intermediate transfer member consisting of a substrate comprising a core shell component having a core and a shell thereover, and wherein said core is selected from the group consisting of silica, mica, titania, and mixtures thereof, and said shell is an antimony tin oxide represented by $Sb_xSn_yO_z$, wherein x, y and z represent the number of atoms, and said core shell component is dispersed in a polymer selected from the group consisting of a polyimide, a polycarbonate, and a poly(butylene terephthalate).

26. An intermediate transfer media member in accordance with claim 25 wherein x is from about 0.40 to about 0.90, y is from about 0.70 to about 0.95, and z is from about 2.10 to about 2.35, and wherein said core is at least one of mica, silica, and titania.

* * * * *